United States Patent
Baek et al.

(10) Patent No.: US 9,937,453 B2
(45) Date of Patent: Apr. 10, 2018

(54) CONTAMINATION SENSOR, AIR PURIFIER HAVING THE SAME AND CONTROL METHOD THEREOF

(71) Applicant: Samsung Electronics Co., Ltd., Suwon-si (KR)

(72) Inventors: Jae-ho Baek, Seoul (KR); Kee-hwan Ka, Suwon-si (KR); Chun-seong Kim, Suwon-si (KR); Jung-kwon Kim, Seoul (KR); Jeong-su Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1 day.

(21) Appl. No.: 14/932,839

(22) Filed: Nov. 4, 2015

(65) Prior Publication Data
US 2016/0121251 A1    May 5, 2016

(30) Foreign Application Priority Data

Nov. 4, 2014  (KR) .......................... 10-2014-0152041
Apr. 30, 2015  (KR) .......................... 10-2015-0061207

(51) Int. Cl.
*B01D 46/10*    (2006.01)
*B01D 46/00*    (2006.01)
*F24F 3/16*    (2006.01)
*F24F 11/00*   (2018.01)

(52) U.S. Cl.
CPC ........ *B01D 46/0086* (2013.01); *F24F 3/1603* (2013.01); *B01D 2273/26* (2013.01); *F24F 2011/0093* (2013.01)

(58) Field of Classification Search
CPC ................ B01D 46/0086; B01D 46/10; B01D 2273/26; F24F 11/001; F24F 3/1603; F24F 2011/0093; F24F 2011/0049

USPC ....... 55/DIG. 34, 385.1; 356/239.1, 432, 72, 356/438; 250/573, 574, 575; 340/607; 15/339
See application file for complete search history.

(56) References Cited

U.S. PATENT DOCUMENTS 3,324,633 A  *  6/1967  Revell .................... B01D 25/32
                                                      210/387
3,985,528 A  *  10/1976  Revell .................... B01D 46/18
                                                      55/352

(Continued)

FOREIGN PATENT DOCUMENTS

JP    10-223081        8/1998
JP    2000354724 A    12/2000

(Continued)

OTHER PUBLICATIONS

Extended European Search Report dated Apr. 5, 2016 in connection with European Application No. 15191949.5, 7 pages.

Primary Examiner — Frank Lawrence, Jr.
Assistant Examiner — Minh-Chau Pham

(57) ABSTRACT

An air purifier includes a main body having an inlet configured to receive air and a discharger configured to discharge the air. The air purifier also includes a filter disposed within the main body and configure to purify contaminates from the air. The air purifier also includes a contamination sensor disposed adjacent to the filter and integrally includes a light emitter configured to emit a light toward the filter and a light receiver configured to receive the light emitted from the light emitter.

19 Claims, 16 Drawing Sheets

(56) References Cited

U.S. PATENT DOCUMENTS

| | | | | |
|---|---|---|---|---|
| 4,279,508 A | * | 7/1981 | Everroad | G01N 21/88 356/237.1 |
| 4,583,859 A | * | 4/1986 | Hall, II | B01D 46/46 250/236 |
| 5,141,309 A | * | 8/1992 | Worwag | A47L 9/19 250/573 |
| 5,192,346 A | | 3/1993 | Kowalczyk | |
| 5,205,156 A | * | 4/1993 | Asano | B01D 46/46 340/607 |
| 5,351,035 A | * | 9/1994 | Chrisco | B01D 46/46 116/DIG. 25 |
| 5,796,472 A | * | 8/1998 | Wirthlin | B01D 46/521 250/227.14 |
| 6,052,058 A | * | 4/2000 | Knox | G08B 17/107 340/607 |
| 6,161,417 A | * | 12/2000 | Nepsund | B01D 35/143 116/268 |
| 7,012,685 B1 | | 3/2006 | Wilson | |
| 2006/0100796 A1 | | 5/2006 | Fraden et al. | |
| 2010/0097233 A1 | | 4/2010 | Larson-Kolomyjec et al. | |
| 2011/0068053 A1 | | 3/2011 | Kim et al. | |

FOREIGN PATENT DOCUMENTS

| | | |
|---|---|---|
| KR | 2019940012006 | 6/1994 |
| KR | 19950031174 | 12/1995 |
| KR | 1019970047349 | 7/1997 |
| KR | 100255349 B1 | 5/2000 |
| KR | 20060027148 A | 3/2006 |
| KR | 20070027044 A | 3/2007 |
| KR | 100728338 B1 | 6/2007 |
| KR | 10-2007-0113180 | 11/2007 |
| KR | 20090113697 A | 11/2009 |
| KR | 20100089342 A | 8/2010 |
| KR | 20100089605 A | 8/2010 |
| KR | 101020171 B1 | 3/2011 |
| KR | 20130102500 A | 9/2013 |

* cited by examiner

CONTAMINATION SENSOR, AIR PURIFIER HAVING THE SAME AND CONTROL METHOD THEREOF

CROSS-REFERENCE TO RELATED APPLICATION(S) AND CLAIM OF PRIORITY

The present application is related to and claims priority from Korean Patent Applications Nos. 10-2014-0152041 and 10-2015-0061207, filed on Nov. 4, 2014, and Apr. 30, 2015, respectively, in the Korean Intellectual Property Office, the disclosure of which is incorporated herein by reference in its entirety.

TECHNICAL FIELD

Sensors, purifiers and methods consistent with what is disclosed herein relate to contamination sensor, an air purifier having the same and a control method thereof, and more particularly, to a contamination sensor configured to determine contamination level, an air purifier having the same, and a control method thereof.

BACKGROUND

Use of air purifiers has been exploded recently, mainly due to increasing air pollution levels experienced around big cities. Stand-alone air purifiers as well as air conditions affixed with the air purification function are commercially available. Generally, an air purifier operates in a manner of drawing in contaminated indoor air, and purifying the drawn air into clean air by filtering out dusts or odor particles entrained in the air. The air purifier thus includes a blower device to discharge purified air once the ambient drawn air is purified, and a filter to filter out dusts or odor particles entrained in the drawn air.

The filter has to be replaced periodically or non-periodically, as it is contaminated in the course of performing air purification function. The shortcoming of the related air purifier is that it is necessary for a user to manually demount the filter from interior of the air purifier to outside and observe it with his or her own eyes to check the contamination level of the filter mounted in the air purifier. As described, the related air purifier has drawbacks of requiring cumbersome filter checking process, not to mention unhygienic work environment issues which arise as the user touches the filter to demount the same outside the air purifier, during which contaminants such as dusts are left on the user's hands. Additionally, dusts may re-scatter from the filter to environment around the user, while the filter is separated from the air purifier and placed outside.

SUMMARY

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

To address the above-discussed deficiencies, it is a primary object to provide, for use in a contamination sensor of enhanced sensitivity, an air purifier having the same, and a control method thereof.

Another technical objective is to provide a contamination sensor with improved ability to determine contamination level of a filter, an air purifier having the same, and a control method thereof. Yet another technical objective is to provide a contamination sensor which automatically determines whether a filter has to be replaced or not and whether the filter is mounted correctly or not, informs a user of a result of the determination, and when the filter is replaced, automatically adjusts the contamination sensor to suit the replacement filter, thus allowing convenient use thereof, and an air purifier having the same, and a control method thereof.

In a first embodiment, an air purifier is provided. The air purifier includes a main body comprising an inlet though which an air is introduced. The air purifier also includes a discharger through which the air is discharged, a filter disposed within the main body to purify a contaminated air, and a contamination sensor disposed adjacent to the filter. The contamination sensor integrally includes a light emitter which emits a light toward the filter and a light receiver which receives the light emitted from the light emitter.

The light emitted from the light emitter can be reflected against or passed through the filter and then received at the light receiver. The light emitter can be disposed so as to emit the light to a first surface of the filter where contaminants are filtered out from the air introduced through the inlet, or to a second surface opposed to the first surface. The light receiver can be disposed so as to face the first surface or the second surface of the filter. The light receiver can be disposed so as to face the first surface or the second surface of the filter which is the same surface that the light emitter faces. The light emitter and the light receiver can be disposed parallel to each other, or at a predetermined angle in a direction the light emitter and the light receiver face each other. The light emitter and the light receiver can be disposed so as to face each other, so that the light emitted from the light emitter is passed through the filter and received at the light receiver. The filter can include a high efficiency particulate air (HEPA) filter, and the light emitter can project a visible light towards HEPA filter.

The light emitter can project infrared light, ultraviolet light, or a visible light towards the filter. The contamination sensor can include a plurality of contamination sensors. The contamination sensor can be attached to or inserted into the main body. The air purifier can include a controller configured to receive a received amount of light at the light receiver and determine a contamination level, and a contamination checker connected to the controller to allow a user to check the contamination level. The contamination checker can be at least one of a display and a speaker. Further, the contamination checker can indicate the contamination level of the filter in stages.

In a second embodiment, an air purifier is provided. The air purifier includes a main body including an air passage comprising an inlet though which an air is introduced. The air purified also includes a discharger through which the air is discharged, a filter disposed on the air passage through which air enters through the inlet and is discharged through the discharger, and a contamination sensor integrally including a light emitter which emits a light toward the filter and a light receiver which receives the light emitted from the light emitter. The light emitter and the light receiver can be disposed so that both face a first surface of the filter corresponding to the inlet or to a second surface of the filter corresponding to the discharger.

The light emitter and the light receiver can be disposed parallel to each other, or at a predetermined angle in a direction the light emitter and the light receiver face each other. The filter can include a high efficiency particulate air (HEPA) filter, and the light can include a visible light. A contamination sensor according to an embodiment includes a housing, a light emitter disposed in the housing to emit a light toward a filter, and a light receiver disposed in the housing to receive the light either reflected from or passed through the filter. The light receiver can output different signals corresponding to the contamination level of the filter, based on an amount of light received at the light receiver. The light emitter and the light receiver can be disposed to face the same surface of the filter, or can be disposed with an intervention of the filter there between. Further, the filter can include a HEPA filter and the light emitted from the light emitter may be a visible light.

In a third embodiment, a contamination sensor includes a housing, a light emitter disposed in the housing to emit a light toward a filter, and a light receiver disposed in the housing to receive the light reflected from the filter. The light receiver outputs different signals corresponding to the contamination level of the filter, based on an amount of light received at the light receiver, and the light emitter and the light receiver can be disposed parallel to each other, or at a predetermined angle in a direction the light emitter and the light receiver face each other.

Further, according to an embodiment, the above-mentioned or other objects can be achieved by providing a control method of an air purifier, which may include filter mounting step of mounting a filter to the air purifier, sensor adjusting step of adjusting a light emitter and a light receiver of a contamination sensor according to the filter, step of counting a use time of the filter, and contamination level measuring step of measuring a contamination level of the filter. The contamination level measuring step can include dividing the contamination level of the filter into at least two or more stages based on the use time of the filter from the contamination level measuring step, and an amount of light received at the light receiver.

The contamination level measuring step includes first measuring step of measuring the contamination level of the filter based on the use time of the filter, and second measuring step of measuring the contamination level of the filter based on the received amount of light at the light receiver. The contamination stages can be changed only when the received amount of light at the light receiver is higher or lower than a boundary amount of light of each contamination stage, by a predetermined amount of light. The contamination level measuring step can include measuring the contamination level of the filter periodically according to a preset time cycle.

After the contamination level measuring step, the control method can additionally include filter replacement determining step of determining whether or not the filter has been replaced, by measuring a variance of the received amount of light at the light receiver after the contamination level measuring step. Step of counting use time of the filter can be performed when the filter has not been replaced, or the contamination sensor can be re-set when the filter has been replaced.

The filter replacement determining step can additionally include step of determining whether the filter is a new filter or a used one which has been in use for a predetermined time period, based on the received amount of light at the light receiver. When the replaced filter is the new filter, the sensor adjusting step can be performed, or when the replaced filter is the used filter which has been in use for the predetermined time period, step of determining time of using the replaced filter can be performed, by using the received amount of light at the light receiver, reflecting the result, and counting the use time of the filter. An operation can be repeatedly performed between the step of counting the use time of the filter and the filter replacement determining step, for a preset time period. The sensor adjusting step can include increasing a duty of the light emitter, when the received amount of light at the light receiver is lower than a minimum amount of light, and decreasing the duty of the light emitter, when the received amount of light at the light receiver is higher than a minimum amount of light.

Further, between the filter mounting step and the sensor adjusting step, the control method can additionally include filter checking step of checking based on the received amount of light at the light receiver, whether or not the filter is mounted, or whether or not the filter is mounted with a packaging material removed. The filter checking step can include determining that the filter is not yet mounted and notifying the result to the user, when the received amount of light at the light receiver is lower than a preset amount of light. In the filter checking step, at least a portion of a packaging material of the filter that corresponds to the contamination sensor can be formed in a color of lower brightness than a contaminated color of the filter, so that when the received amount of light at the light receiver is lower than a preset amount of light, it is determined that the filter is mounted without the packaging material being removed and thus the result can be notified to the user.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
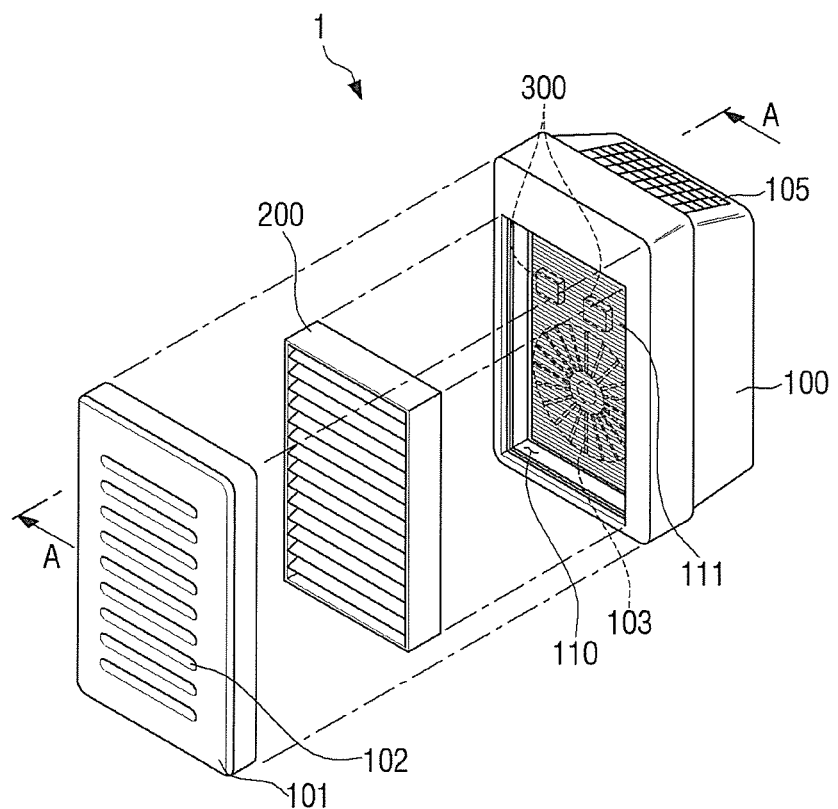
FIG. 1 is an exploded perspective view of an example air purifier according to this disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device or air purifier. Certain exemplary embodiments of the present inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

Use of air purifiers has been exploded recently, mainly due to increasing air pollution levels experienced around big cities. Stand-alone air purifiers as well as air conditions affixed with the air purification function are commercially available. Generally, an air purifier operates in a manner of drawing in contaminated indoor air, and purifying the drawn air into clean air by filtering out dusts or odor particles entrained in the air. The air purifier thus includes a blower device to discharge purified air once the ambient drawn air is purified, and a filter to filter out dusts or odor particles entrained in the drawn air.

The filter has to be replaced periodically or non-periodically, as it is contaminated in the course of performing air purification function. The shortcoming of the related air purifier is that it is necessary for a user to manually demount the filter from interior of the air purifier to outside and observe it with his or her own eyes to check the contamination level of the filter mounted in the air purifier. As described, the related air purifier has drawbacks of requiring cumbersome filter checking process, not to mention unhygienic work environment issues which arise as the user touches the filter to demount the same outside the air purifier, during which contaminants such as dusts are left on the user's hands. Additionally, dusts may re-scatter from the filter to environment around the user, while the filter is separated from the air purifier and placed outside.

In order to solve the drawings mentioned above, related technologies proposed implementing a variety of sensors for the air purifier to determine a period for the filter replacement. A contamination sensor is provided as one of these sensors, which utilizes lights. The contamination sensor using light has a light emitter and a light receiver, spaced away from each other at a considerable distance and each formed of separate components.

Meanwhile, considering the inverse proportional relation between the amount of light received at the light receiver, and the square of a distance between the light emitter and the light receiver, it is difficult for the related contamination sensor using light to accurately determine contamination level of the filter, due to remote distance between the light emitter and the light receiver which deteriorates contamination measuring sensitivity. Further, it is difficult for the related air purifier to determine contamination level of the filter, as the related air purifier measures contamination level of the filter by using only one of the amount of light received at the light receiver and filter use time.

Referring to FIG. 1, an air purifier 1 according to a first embodiment includes a main body 100, a cover 101, a filter 200, and a contamination sensor 300. The main body 100 forms an outer appearance of the air purifier 1, and includes a filter mount 110, an inner grill 103, and a discharger 105. After the filter 200 is mounted to the filter mount 110, the cover 101 is mounted to the main body 100 to cover the filter 200. In this example, the cover 101 is separably mounted to the main body 100 to allow replacement of the filter 200, and to do so, include a connecting structure (e.g., coupling protrusion for snap coupling, or fastening screws, etc.). Additionally, an inlet 102 is formed on the cover 101 to introduce external air. The inlet 102 includes a plurality of longitudinal holes. In an embodiment, the inlet is formed on the cover 101 and located in a rear surface of the main body 100, although exemplary embodiments are not limited thereto. Accordingly, the inlet 102 is formed on a side surface of the cover 102, or a side surface or an upper surface of the main body 100.

Further, as illustrated in FIG. 1, the inlet 102 includes a plurality of longitudinal holes disposed at vertical intervals from each other, but exemplary embodiments are not limited thereto. Accordingly, the inlet 102 includes a plurality of circular or polygonal holes, which can be aligned regularly or irregularly. The inlet 102 is distributed across an area roughly corresponding to the area of the filter 200 so that the external air is filtered with the entire filter 200. The filter mount 110 is a space where the filter 200 is mounted, and is formed in a size approximately corresponding to the size of the filter 200. Further, the inner grill 103 is formed on an inner side surface 111 of the filter mount 110. The inner grill 103, including a plurality of through-holes, secondarily removes contaminants from the air previously filtered through the filter 200 before the air reaches the discharger 105. Accordingly, the air is filtered secondarily through the inner grill 103 and discharged out through the discharger 105 formed on the main body 100.

Similarly to the inlet 102, the discharger 105 includes a plurality of through-holes or a plurality of longitudinal holes. As illustrated in FIG. 1, the discharger 105 is formed on an upper surface of the main body 100, but not limited thereto. Accordingly, the discharger 105 is formed on a front surface, a rear surface or a side surface of the main body 100. The filter 200 is formed on an air path inside the main body 100, along which the external air introduced through the inlet 102 is discharged through the discharger 105. The filter 200 captures contaminants entrained in the air from the air and permits only the purified air to pass through.

Further, the filter 200 includes a plurality of filters with different functions such as, for example, a pre-filter, a deodorization filter or a high efficiency particulate air (HEPA) filter. For convenience of description, only the HEPA filter is illustrated in FIG. 1 and FIGS. 3 to 7 as an example of a plurality of filters included in the filter 200, but it will be understood that the exemplary embodiments are applicable to other types of filters as well as the HEPA filter. The filter 200 needs replacement, as contaminants accumulate in the course of performing air purification operation.

Figure 2:
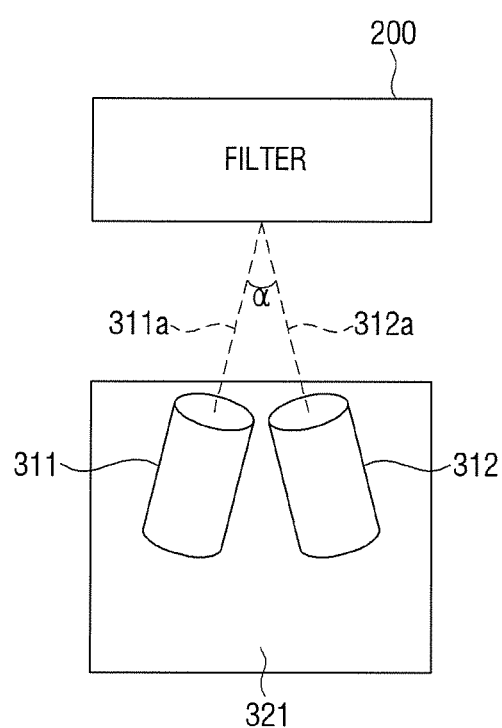
FIG. 2 is a schematic view of an example contamination sensor according to this disclosure.

Referring to FIGS. 1 and 2, the contamination sensor 300 according to a first embodiment is disposed adjacent to the filter 200 to detect contamination of the filter 200. The contamination sensor 300 includes a light emitter 311 and a light receiver 312 together in a housing 321. As described herein, the light emitter 311 and the light receiver 312 are integrally provided within the housing 321 so that unlike the related technologies, the light emitter 311 and the light receiver 312 are kept at a minimum distance from each other.

Further, for convenience of description, FIG. 1 illustrates an example in which two contamination sensors 300 are provided, but exemplary embodiments are not limited thereto. Accordingly, only one or three or more contamination sensors 300 are provided. Additionally, the contamination sensor 300 according to the first embodiment measures the contamination level of the filter 200 by receiving the light reflected from the filter 200, but exemplary embodiments are not limited thereto. Accordingly, the contamination level of the filter 200 can also be measured by receiving the light passing through the filter 200, as will be described in detail herein with reference to the second and the third embodiments.

Referring to FIG. 2, the light emitter 311 and the light receiver 312 are integrally formed with each other by the housing 321, as already described above. Accordingly, the light emitter 311 and the light receiver 312 are located close to each other, according to which the light receiver 312 receives the light emitted from the light emitter 311 with enhanced sensitivity. At this time, the light emitter 311 and the light receiver 312 are disposed to face the same surface of the filter 200. Further, the light emitter 311 and the light receiver 312 are arranged so that a light axis 311a of the light emitter 311 and a light axis 312a of the light receiver 312 are at a predetermined angle α in a direction the two are faced to each other. This arrangement allows more amount of light to be received at the light receiver 312, compared to a simple parallel arrangement of the light emitter 311 and the light receiver 312.

Arranged as described herein, the light emitter 311 of the contamination sensor 300 emits light toward the filter 200, and the light receiver 312 receives the reflective light from the filter 200. Most of the light emitted from the light emitter 311 is absorbed in the process of being reflected from the filter 200, so that only an unabsorbed portion of the light is received at the light receiver 312. When the contamination level of the filter 200 is high, more light is absorbed at the filter 200, in which case the amount of light received at the light receiver 312 is decreased. When the contamination level of the filter 200 is low, then less amount of light is absorbed at the filter 200, in which case the amount of light received at the light receiver 312 is increased. Accordingly, the contamination sensor 300 measures the contamination level of the filter 200 based on the differences in the amount of light received at the light receiver 312.

Additionally, the light emitter 311 can emit any of infrared light, ultraviolet light and visible light. Note that, in order to measure the contamination level of the HEPA filter of a plurality of filters which are included in the filter 200, the light emitter 311 desirably emits the visible light as this type of light has the highest sensitivity for the HEPA filter.

Further, the light emitter 311 is configured to emit an infrared light, in which case unit price is lowered compared to the light emitter 311 for emitting visible light. Meanwhile, differently from the illustration in FIG. 2, the light emitter 311 and the light receiver 312 are arranged parallel to each other, in which case the light emitter 311 and the light receiver 312 are located at a close distance, considering that the amount of light received at the light receiver 312 increases as the distance between the light emitter 311 and the light receiver 312 is shorter. Note that it is desirable to provide a blocking member protruding to a predetermined length between the light emitter 311 and the light receiver 312 to prevent difficulty of accurate measurement of the contamination level of the filter 200 when the light emitted from the light emitter 311 is directly received at the light receiver 312 due to light scattering phenomenon.

Figure 3:
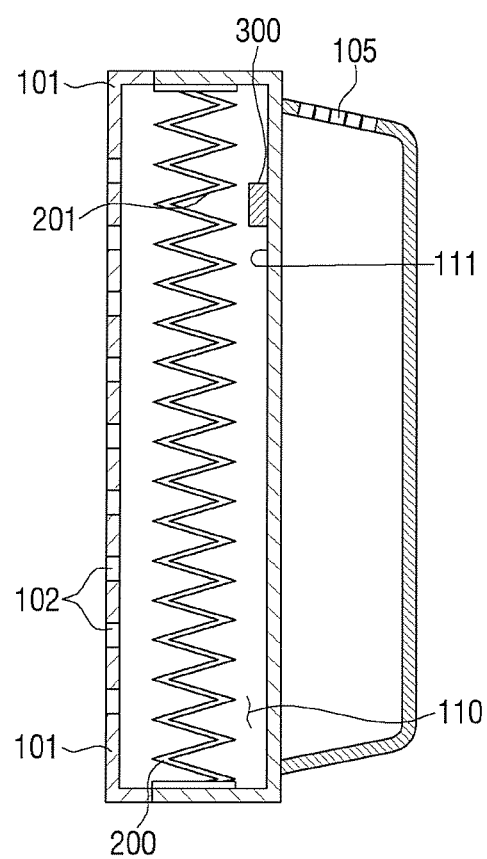
FIG. 3 is a cross sectional view of an example air purifier according to this disclosure.
Figure 4:
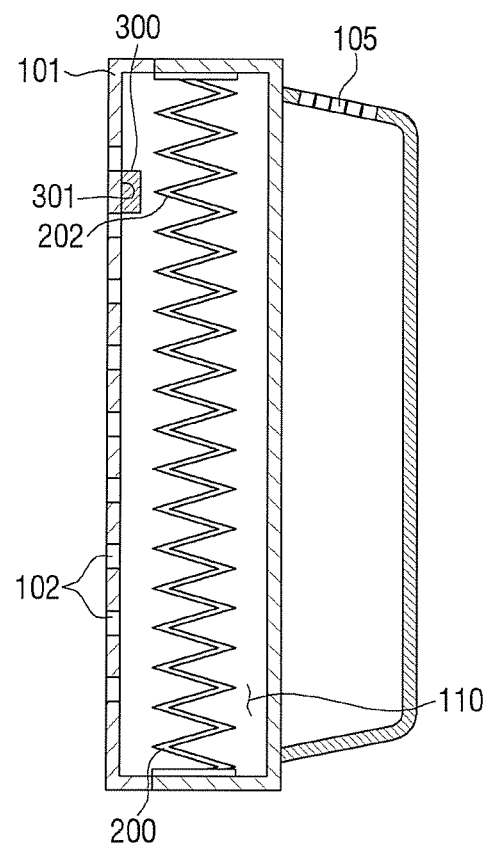
FIG. 4 is a cross sectional view of an example contamination sensor according to this disclosure.

Referring to FIG. 3, the air purifier 1 according to the first embodiment includes the contamination sensor 300 mounted to an inner side surface 111 of the filter mount 110 formed in the main body 100. In this example, the contamination sensor 300 is faced to a rear surface 201 of the filter which corresponds to the discharger 105. Accordingly, the light emitted from the light emitter 311 is reflected against the rear surface 201 of the filter which is arranged on the side of the discharger 105 and received at the light receiver 312.

As illustrated in FIG. 3, the contamination sensor 300 is arranged on an upper portion of the inner side surface 111 of the filter mount 110, but exemplary embodiments are not limited thereto. Accordingly, the contamination sensor 300 is arranged on an intermediate, or a lower portion of the inner side surface 111 of the filter mount 110. There can be a plurality of the contamination sensor 300 as described herein, and the contamination sensors 300 can be aligned with a regular arrangement pattern or irregular arrangement pattern on the inner side surface 111 of the filter mount 110.

Further, the contamination sensor 300 is inserted and fixed in a fixing hole (not illustrated) which is formed in a portion of the inner side surface 111 of the filter mount 110. Such configuration can assist to reduce a thickness of the air purifier 1. Further, referring to FIG. 4, the air purifier 1 according to the first embodiment can have the contamination sensor 300 mounted to the cover 101 of the main body 100. In the example mentioned above, the light emitter 311 emits the light to the front surface 202 of the filter 200 which corresponds to the inlet 102, and the emitted light is reflected against the front surface 202 of the filter 200 corresponding to the inlet 102 and received at the light receiver 312. This arrangement allows increased accuracy of contamination level measurement of the filter 200, compared to the arrangement illustrated in FIG. 3. Note that the contamination sensor 300 is desirably arranged on an inner surface 301 of the portion of the cover 101, away from the inlet 102, so as not to block the inlet 102 and interfere with the air flow introduced into the inlet 102.

Figure 5:
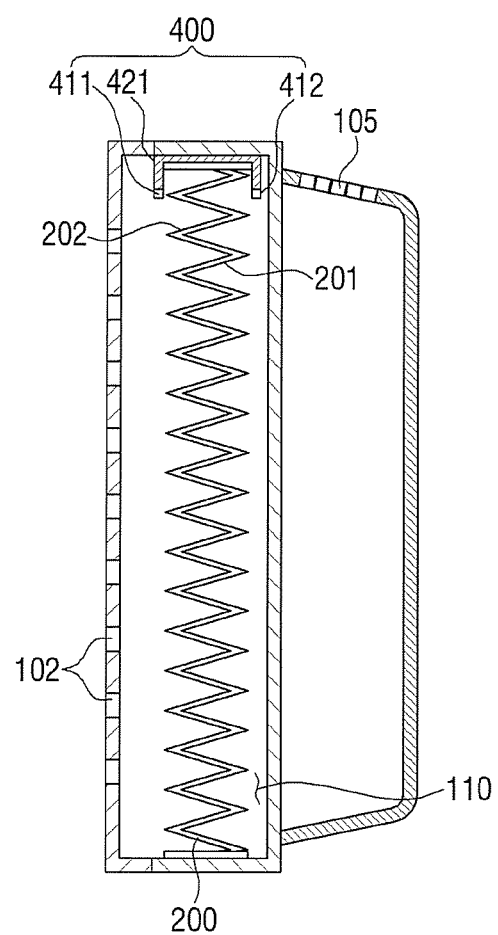
FIG. 5 is a cross sectional view of an air purifier according to this disclosure.

Additionally, the contamination sensor 300 according to the first embodiment is spaced away from the filter 200 by a preset optimum distance to allow efficient reception of the light emitted from the light emitter 311 at the light receiver 312. Referring to FIG. 5, the contamination sensor 400 according to the second embodiment receives the light passed through the filter 200 to measure the contamination level of the filter 200. The contamination sensor 400 includes a light emitter 411 and a light receiver 412 integrally provided in a housing 421, which is similar to the first embodiment. However, a difference is that the light emitter 411 and the light receiver 412 are arranged to face each other with the intervention of the filter 200 interposed there between.

Further, the light emitter 411 emits a light toward a front surface 202 of the filter 200 corresponding to the inlet 102, or emits the light toward a rear surface 201 of the filter 200 corresponding to the discharger 105. Further, the light axis of the light emitter 411 and the light axis of the light receiver 412 can desirably be disposed on a same line (or axis). At this time, the light receiver 412 measures the contamination level of the filter 200 according to the amount of light of the light which is received after being emitted from the light emitter 411 and passed through the filter 200. That is, lower amount of light passing through the filter 200 leads into lower amount of light received at the light receiver 412, while higher amount of light passing through the filter 200 leads into higher amount of light received at the light receiver 412. In this example, it can be determined that the contamination level of the filter 200 is high when the amount of light received at the light receiver 412 is low, while it is determined that the contamination level of the filter 200 is low, when the received amount of light is high. The light receiver 412 transits to the controller 600 different signals according to the received light intensities.

Further, according to the second embodiment, the housing 421 of the contamination sensor 400 have an approximately '⊏' shape in which the light emitter 411 and the light receiver 412 are faced different surfaces from each other. The housing 421 is attached onto an upper surface of the filter mount 110 of the main body 100, as illustrated, or alternatively, attached to a lower surface or a side surface of the filter mount 110 (not illustrated). Note that the shape of the contamination sensor 400 is not limited to any specific examples provided above, but can be any shape provided that it emits light toward the filter 200 and receive the passed light.

Figure 6:
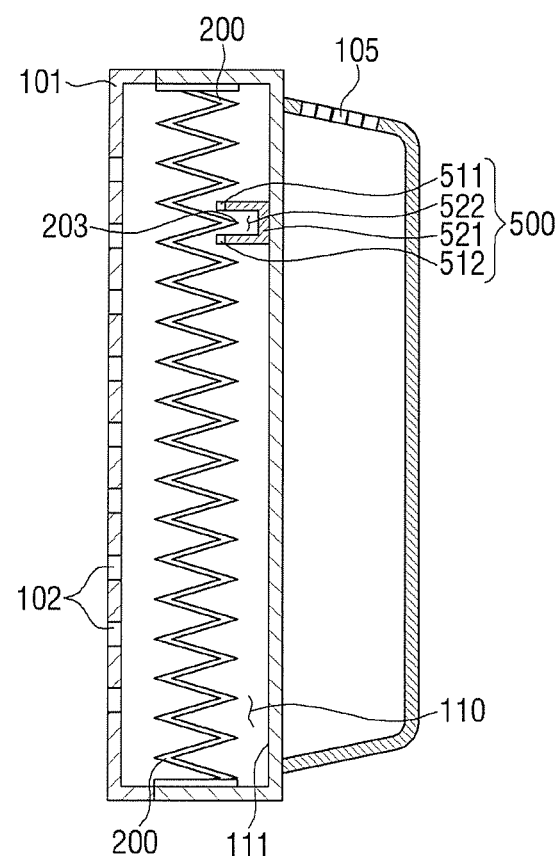
FIG. 6 is a cross sectional view of an example air purifier according to this disclosure.
Figure 7:
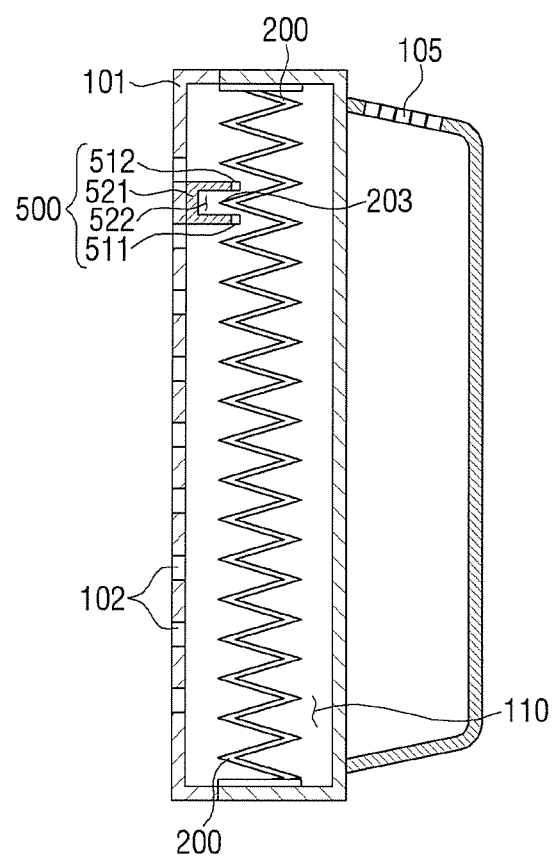
FIG. 7 is a cross sectional view of an example contamination sensor according to this disclosure.
Figure 8:
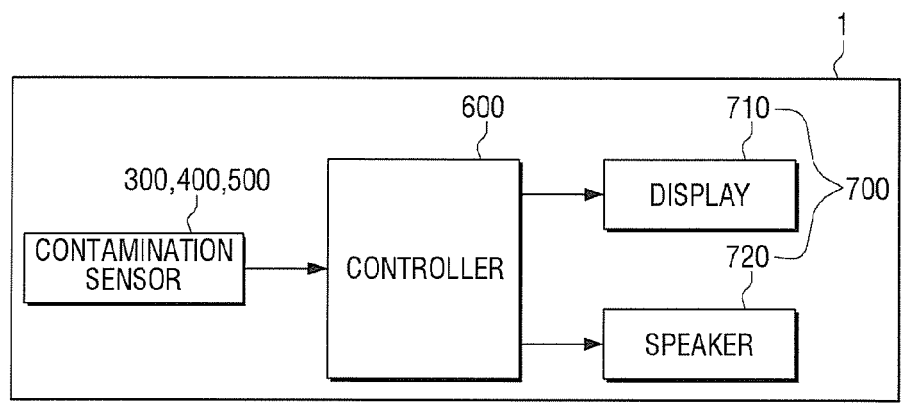
FIG. 8 is a block diagram of an example method for controlling an air purifier according to this disclosure.

Referring to FIGS. 6 and 7, the contamination sensor 500 according to a third embodiment includes a light emitter 511 and a light receiver 512 arranged to face each other in a housing 521, which is similar to the contamination sensor 400 according to the second embodiment. However, a difference is that a portion of the filter 200 which includes a corner 203 is arranged to be located in an interior space 522 of the housing 521. Accordingly, the light emitted from the light emitter 511 is passed through the surfaces of the filter 200 and received at the light receiver 512.

The contamination sensor 500 receives the light passed through the filter 200 at the light receiver and measures the contamination level of the filter 200. Specifically, the contamination sensor 500 is suitable for measuring contamination level of the HEPA filter among a plurality filters that can be included in the filter 200. At this time, the light emitter 511 and the light receiver 512 are arranged to face each other with the intervention of a protruding portion of the filter 200 interposed there between, as illustrated in FIG. 6. The light emitter 511 is arranged on an upper side and the light receiver 512 is arranged on a lower side. Accordingly, as the light is emitted from the light emitter 511, the light is passed through the protruding portion of the filter 200 and then received at the light receiver 512.

Meanwhile, the light emitter 511 and the light receiver 512 are arranged in an inverse manner to the embodiment described above. That is, the light emitter 511 is arranged on the lower side and emit a light toward the light receiver 512 arranged on the upper side. Further, as illustrated in FIG. 6, the contamination sensor 500 is arranged on the inner side surface 111 of the filter mount 110, or is arranged on the cover 101 as illustrated in FIG. 7. As described herein, the contamination sensor 500 can desirably be arranged away from the through-holes of the inlet 102 formed on the cover 101 so as not to block the inlet 102 and interfere with the inflow of the air.

As described with reference to the second embodiment, the light receiver 512 measures the contamination level of the filter 200 according to the amount of light of the light which is emitted from the light emitter 511 and passed through the filter 200. Further, in a similar manner described above with reference to the second embodiment, according to the third embodiment, the housing 521 is formed that the light emitter 511 and the light receiver 512 are faced toward different surfaces of the filter 200. As described herein, the housing 521 is disposed on the inner side surface 111 of the filter mount 110 or mounted to the cover 101. Further, when mounted to the cover 101, the housing 521 is disposed at a location so as not to interfere with the inlet 102.

Additionally, according to the first to the third embodiments described above, when a plurality of contamination sensors 300, 400, 500 are provided, one of the contamination sensors 300, 400, 500 is disposed at a location at which the light emitted from the light emitters 311, 411, 511 are not passed through or reflected from the filter 200, but directly received at the light receivers 312, 412, 512, thus determining a reference value for the received amount of light. Further, referring to FIG. 8, the air purifier 1 according to embodiments additionally includes a controller 600 and a contamination checker 700. The controller 600 is connected to the contamination sensor 300, 400, 500 and receives a signal according to the received amount of light at the light receiver 312, 412, 512 from the contamination sensor 300, 400, 500. Further, the controller 600 determines the contamination level of the filter 200 by comparing the single delivered from the contamination sensor 300, 400, 500 with a boundary value of each contamination stage as stored at a memory provided in the controller 600. The controller 600 then delivers the information about the determination on the contamination level to the contamination checker 700 for notice by the user.

The contamination checker 700 is connected to the controller 600 and receives the information about the contamination level from the controller 600. Additionally, the contamination checker 700 notifies the user additional information delivered from the controller 600 as well as the information about the contamination level, as to whether or not the filter 200 is not mounted yet, as to whether or not the filter 200 is mounted without packaging material thereof being removed, or as to the use time of the filter 200, for example.

The contamination checker 700 is a display 710 which allows the user to check the contamination level of the filter 200 visually, or a speaker 720 which allows the user to check it in auditory manner. The display 710 indicates the contamination levels in stages with different numbers or colors, and the speaker 720 distinguishes the respective stages with sound volumes or rhythms. Further, the contamination checker 700 includes both the display 710 and the speaker 720, in which case the contamination checker 700 notifies the user of the contamination level of the filter 200 in both visual and auditory manners.

Figure 9:
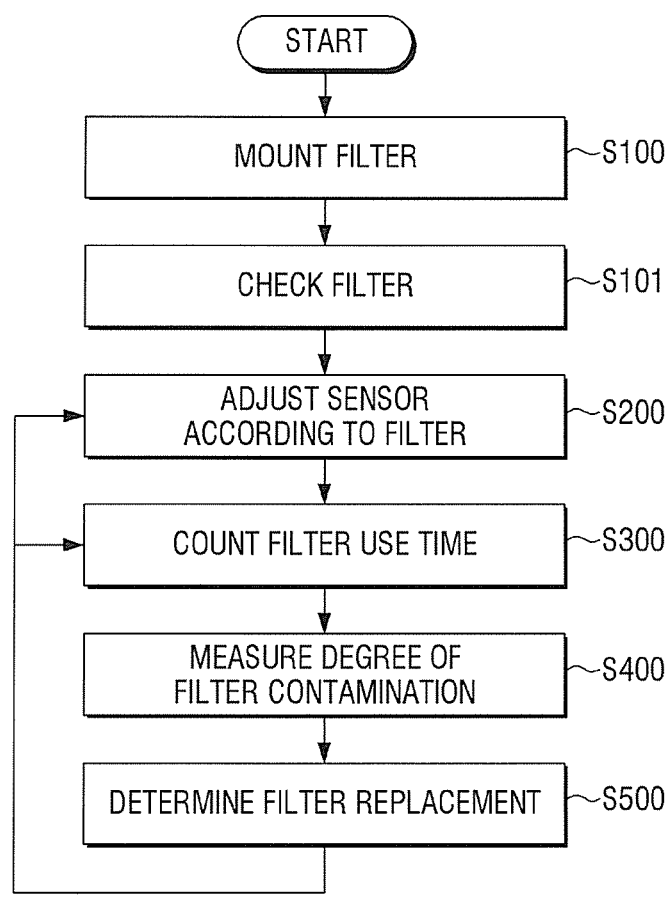
FIG. 9 is a flowchart of an example method for controlling an air purifier according to this disclosure.

As discussed herein, the process of detecting contamination of the filter 200 with the contamination sensors 300, 400, 500 configured according to embodiments will be explained in sequential order, by referring to FIGS. 9 to 16. Referring first to FIG. 9, the user mounts new filter 200 to an interior of the air purifier 1, at S100. Next, the controller 600 determines if the filter 200 is mounted properly, at S101. Specifically, the filter 200 is packaged with a packaging material which is in a color that has a lower brightness than the contaminated color of the filter 200. The packaging material is entirely formed in a color that has a lower brightness than the contaminated floor of the filter 200, or only a portion of the packaging material that corresponds to the contamination sensor 300, 400 is formed in a color of lower brightness than the contaminated color of the filter 200. When the filter 200 is mounted to the air purifier 1 without the packaging material thereof being properly removed, this will not pose any problem according to the third embodiment is disposed between the grooves formed on the filter 500, as mounting the filter 200 itself is impossible because the contamination sensor 500. However, according to the first and the second embodiments, the contamination sensors 300, 400 are mounted to the air purifier 1 without difficulty.

In the case of the contamination sensors 300, 400 according to the first and the second embodiments, the above means that the filter 200 with the packaging material is mounted to the air purifier 1, in which case the air purifier 1 cannot efficiently purify the contaminants entrained in the air while driving.

Accordingly, when the user mounts new filter 200 to interior of the air purifier 1, the controller 600 operates the contamination sensor 300, 400 and accordingly measures the amount of light received at the light receiver 312, 412. Because the packaging material for the filter 200 is in a color of lower brightness than the contaminated color of the filter 200, most of the light emitted from the light emitter 311, 411 will be absorbed in the packaging material, allowing only a small portion of the amount of light to be received at the light receiver 312, 412.

That is, when the received amount of light at the light receiver 312, 412 is lower than a preset amount of light, the controller 600 recognizes that the filter 200 is still in the packaging material, and thus notifies this to the user through the contamination checker 700. Additionally, the operation at S101 also involves determining whether the operation at S100 is omitted or not. Specifically, when the user skips mounting the filter 200 to the air purifier 1 and directly closes the cover 101, the operation at S200 is performed as described herein, emitting light from the light emitter 311, 411, 511.

According to the first embodiment, the contamination sensor 300 is spaced from the filter 200 at a preset optimum distance so as to allow the light emitted from the light emitter 311 to be reflected against the filter 200 and received at the light receiver 312 efficiently. Accordingly, when the filter 200 it not mounted in place, such absence of the filter 200 hinders the light emitted from the light emitter 311 from reaching the light receiver 312. As a result, very low amount of light will be received at the light receiver 312.

On the contrary, in the examples of the contamination sensors 400, 500 according to the second and the third embodiments, the absence of the filter 200 mounted in place will cause the light emitted from the light emitter 411, 511 to be directly received at the light receiver 412, 512, in which case very high amount of light will be received at the light receiver 412, 512. Accordingly, at S200, it is determined as to whether the filter 200 is mounted to the air purifier 1 and if not, such determination is notified to the user. Next, the controller adjusts the contamination sensor 300, 400, 500 according to the filter 200 as mounted, at S200.

Figure 10:
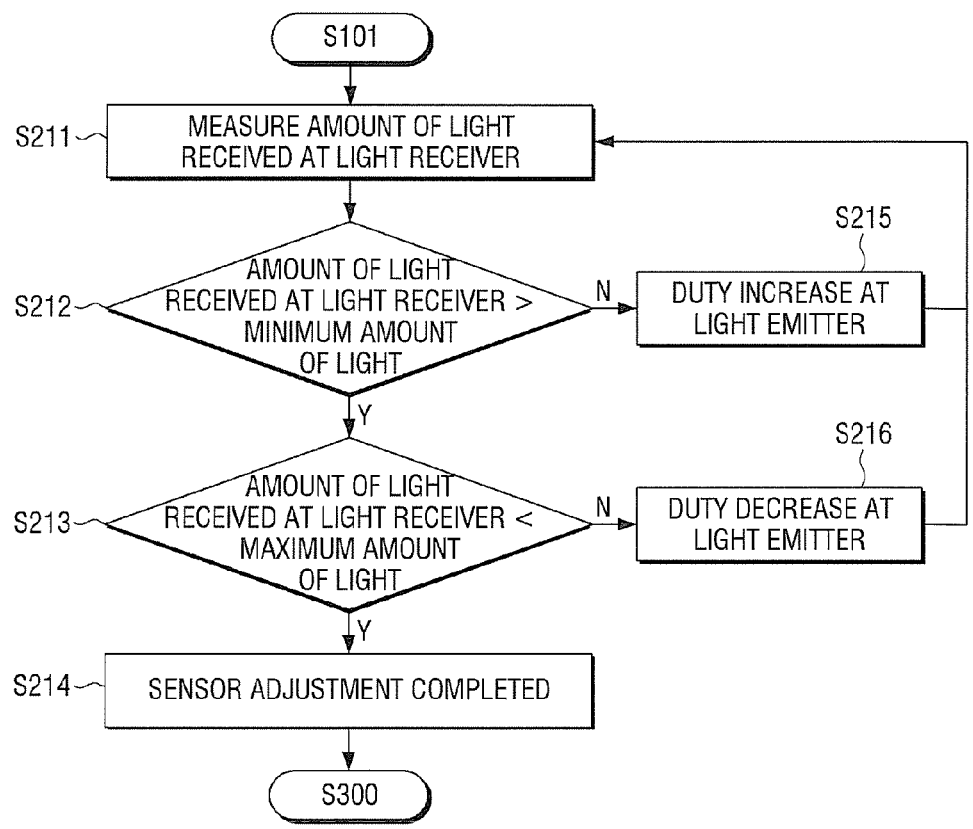
FIG. 10 is a flowchart of an example method according to this disclosure.

Specifically, referring to FIG. 10, the light receiver 312, 412, 512 of the contamination sensor 300, 400, 500 receives a light emitted from the light emitter 311, 411, 511 of the contamination sensor 300, 400, 500, at S211, and converts the received amount of light into an electrical signal and delivers the result to the controller 600. In response to receiving information about the received amount of light from the light receiver 312, 412, 512, the controller 600 compares the received information with a preset, minimum amount of light, at S212.

When the amount of light received at the light receiver 312, 412, 512 is lower than the minimum amount of light, it indicates that the amount of light emitted from the light emitter 311, 411, 511 is too low to measure the contamination level of the filter 200, in which case the duty of the light emitter 311, 411, 511 is increased, at S215. When the duty of the light emitter 311, 411, 511 is increased, the intensity of the light emitted from the light emitter 311, 411, 511 is increased. After that, the light receiver 312, 412, 512 continues receiving (S211) the light emitted from the light emitter 311, 411, 511 and performs the operation at S212. On the contrary, when the amount of light received at the light receiver 312, 412, 512 is higher than the minimum amount of light, and then it is compared with the maximum amount of light, at S213.

When the amount of light received at the light receiver 312, 412, 512 is higher than the maximum amount of light, this means that the amount of light emitted from the light emitter 311, 411, 511 is too high to measure the contamination level of the filter 200, in which case the duty of the light emitter 311, 411, 511 is decreased, at S216. When the duty of the light emitter 311, 411, 511 is decreased, the intensity of the light emitted from the light emitter 311, 411, 511 is decreased. After that, the light receiver 312, 412, 512 continues receiving the light emitted from the light emitter 311, 411, 511 and performs the operation at S212.

Meanwhile, when the amount of light received at the light receiver 312, 412, 512 is lower than the maximum amount of light, sensor adjustment is finished, at S214. Next, as the air purifier 1 is driving, the controller 600 counts the use time of the filter 200, at S300. Further, the contamination sensor 300, 400, 500 starts measuring the contamination level of the filter 200, at S400. The operation at S400 is performed periodically according to a preset time cycle, which is preferably one-hour cycle, for example. Additionally, the contamination level is distinguished with two or more stages when notified to the user, but for convenience of description, it is exemplified herein that the contamination level is divided into three stages (high, middle, low) when notified to the user.

Figure 11:
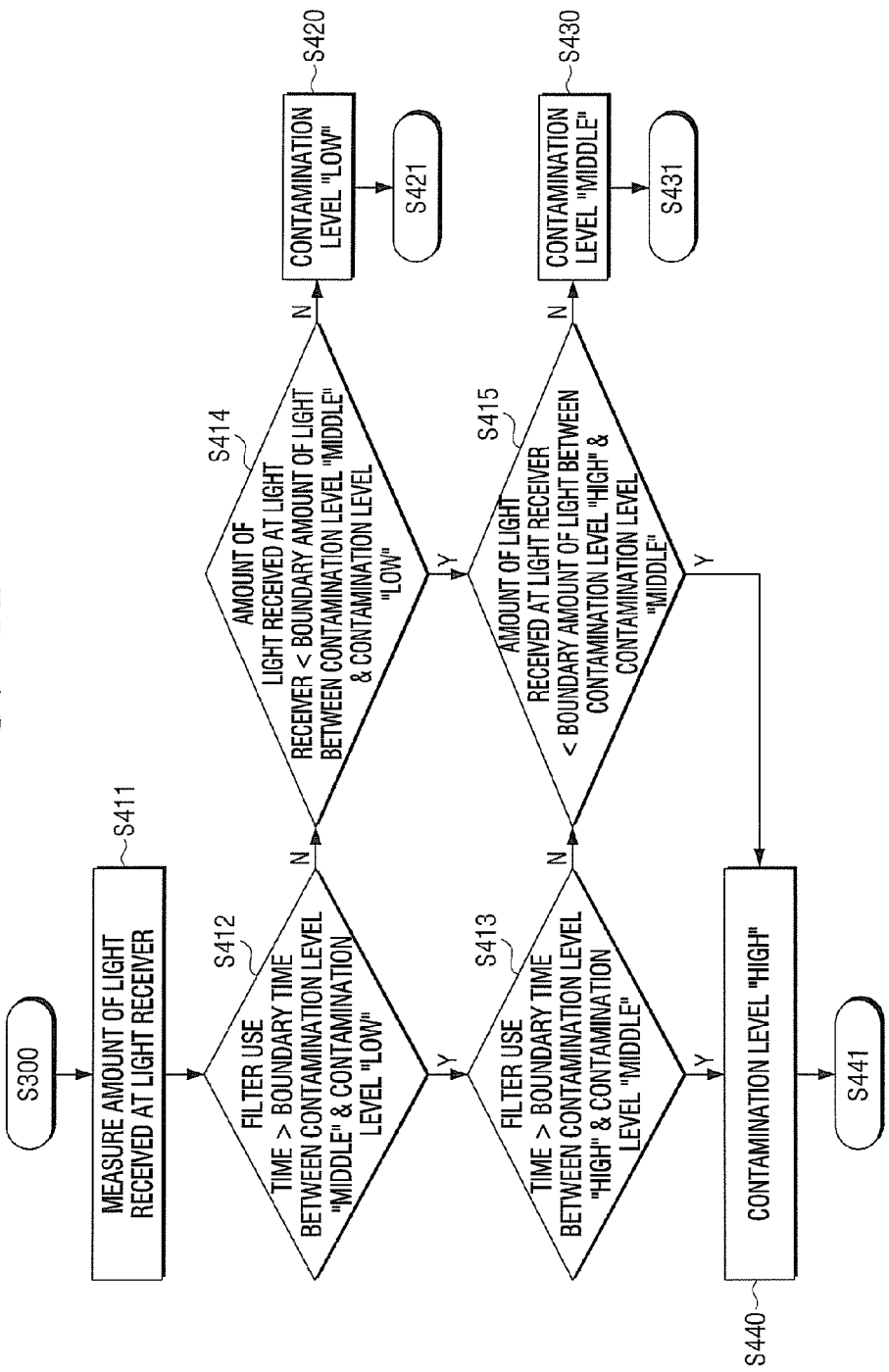
FIG. 11 is a flowchart of an example method according to this disclosure.

Specifically, referring to FIG. 11, the light receiver 312, 412, 512 of the contamination sensor 300, 400, 500 receives the light emitted from the light emitter 311, 411, 511 of the contamination sensor 300, 400, 500, and measures the received amount of light, at S411. After that, the measured amount of light is converted into an electrical signal and delivered to the controller 600. In response to receiving from the light receiver 312, 412, 512 the information of the received amount of light, the controller 600 first compares the use time of the filter 200 with a boundary time between the contamination level "Middle" and the contamination level "Low", at S412.

When the use time of the filter 200 is shorter than the boundary time between the contamination level "Middle" and the contamination level "Low", this means that the filter 200 has been in use for a small amount of time, and accordingly, the received amount of light at the light receiver 312, 412, 512 is compared with the boundary amount of light between the contamination level "Middle" and the contamination level "Low", at S414. When the received amount of light at the light receiver 312, 412, 512 is higher than the boundary amount of light between the contamination level "Middle" and the contamination level "Low", meaning that the filter 200 is relatively not contaminated, thus allowing a high amount of light emitted from the light emitter 311, 411, 511 to be reflected or passed and received at the light receiver 312, 412, 512, the contamination level is determined to be "Low", at S420. That is, when the use time of the filter 200 is shorter than the boundary time between the contamination level "Middle" and the contamination level "Low", and when the amount of light received at the light receiver 312, 412, 512 is higher than the boundary amount of light between the contamination level "Middle" and the contamination level "Low", the contamination level is determined to be "Low". Additionally, this is notified to the user through the contamination checker 700.

On the contrary, when the received amount of light at the light receiver 312, 412, 512 is lower than the boundary amount of light between the contamination level "Middle" and the contamination level "Low", meaning that the filter 200 is somewhat contaminated, thus allowing only a certain amount of light emitted from the light emitter 311, 411, 511 to be reflected or passed and received at the light receiver 312, 412, 512, the received amount of light at the light receiver 312, 412, 512 is compared with the boundary amount of light between the contamination level "High" and the contamination level "Middle" to obtain more specific determination of the contamination level, at S415.

When the received amount of light at the light receiver 312, 412, 512 is higher than the boundary amount of light between the contamination level "High" and the contamination level "Middle", meaning that the filter 200 is somewhat contaminated, thus allowing only a certain amount of light emitted from the light emitter 311, 411, 511 to be reflected or passed and received at the light receiver 312, 412, 512, the contamination level is determined to be "Middle", at S430. That is, even when the use time of the filter 200 is shorter than the boundary time between the contamination level "Middle" and the contamination level "Low", when the amount of light received at the light receiver 312, 412, 512 falls into a light amount range of the contamination level "Middle", the contamination level is determined to be "Low". Additionally, this result is notified to the user through the contamination checker 700.

On the contrary, when the received amount of light at the light receiver 312, 412, 512 is lower than the boundary amount of light between the contamination level "High" and the contamination level "Middle", meaning that the filter 200 is considerably contaminated, thus most of the light emitted from the light emitter 311, 411, 511 is absorbed in the filter 200, leaving very little amount of light received at the light receiver 312, 412, 512, the contamination level is determined to be "High", at S440. That is, even when the use time of the filter 200 is shorter than the boundary time between the contamination level "Middle" and the contamination level "Low", when the amount of light received at the light receiver 312, 412, 512 falls into a light amount range of the contamination level "High", the contamination level is determined to be "High". Additionally, this result is notified to the user through the contamination checker 700.

On the contrary, when the use time of the filter 200 is longer than the boundary time between the contamination level "Middle" and the contamination level "Low", meaning that the filter 200 has been in use for more than a certain period of time, the use time of the filter 200 is compared with the boundary time between the contamination level "High" and the contamination level "Middle", at S413.

At this time, considering that the longer use time of the filter 200 than the boundary time between the contamination level "Middle" and the contamination level "Low" indicates that the filter 200 has been in use for a considerable amount of time, the contamination level is determined to be "High", at S440. That is, the contamination level is determined to be "High" regardless of the amount of light received at the light receiver 312, 412, 512, as long as the use time of the filter 200 is in the "High" range of the contamination level. Additionally, this result is notified to the user through the contamination checker 700.

On the contrary, when the use time of the filter 200 is shorter than the boundary time between the contamination level "High" and the contamination level "Middle", meaning that the filter 200 has been in use for a certain period of time, the received amount of light at the light receiver 312, 412, 512 is compared with the boundary amount of light between the contamination level "High" and the contamination level "Middle" to obtain more specific determination of the contamination level, at S415. After that, the comparison at S415 and subsequent determination are performed in the same manner already described above, which will not be redundantly described below. To just briefly describe the result, the contamination level is determined to be "Middle" even when the use time of the filter 200 is in the range of the contamination "Middle", as long as the received amount of light at the light receiver 312, 412, 512 is in the range of light amount of the contamination "High". Additionally, this result is notified to the user through the contamination checker 700.

As described herein, the air purifier 1 according to embodiments measures the contamination level of the filter 200 with increased accuracy, as it measures the contamination level of the filter 200 by considering both the use time of the filter 200 and the received amount of light at the light receiver 312, 412, 512. Further, referring to FIG. 12, when the received amount of light at the light receiver 312, 412, 512 is in the boundary between the contamination level "Middle" and the contamination level "Low", the amount of light measured at the light receiver 312, 412, 512 is varied within a predetermined range by irradiation of the light according to pulse width modulation ("PWM") at the light emitter 311, 411, 511. In this case, the contamination level of the filter 200 notified to the user through the contamination checker 700 is continuously varied between "Middle" and "Low", confusing the user from perceiving the status correctly. According to the embodiments, the controller 600 thus performs an additional controlling operation, when the received amount of light at the light receiver 312, 412, 512 is in the boundary of the respective contamination stages.

Figure 12:
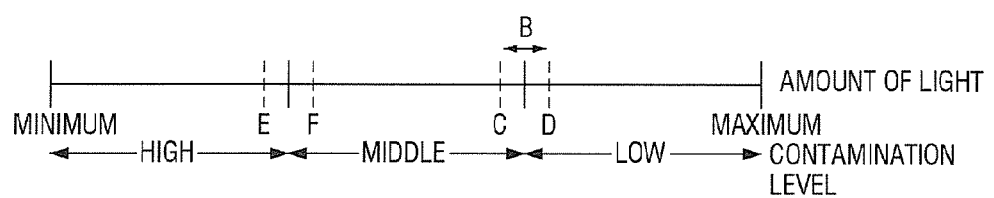
FIG. 12 is a schematic view illustrating a range of contamination levels of an example filter according to amount of light received at a light receiver according to this disclosure.
Figure 13:
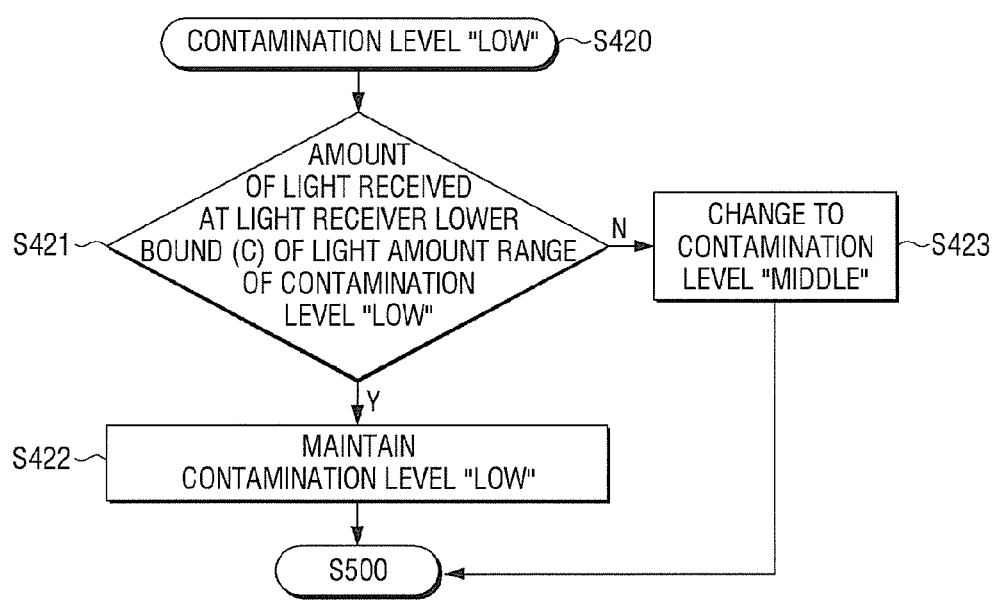
FIGS. 13, 14, 15, and 16 are a flowcharts of example method according to this disclosure.

Specifically, referring to FIGS. 12 and 13, when the contamination level is determined by the controller 600 to be "Low" based on the use time of the filter 200 and the received amount of light at the light receiver 312, 412, 512, at S420, the controller 600 compares the received amount of light at the light receiver 312, 412, 512 with the lower bound C of the amount of the light corresponding to the light amount range of the contamination level "Low", at S421. When the received amount of light at the light receiver 312, 412, 512 is higher than the lower bound C of the light amount range corresponding to the contamination level "Low", the controller 600 maintains the contamination level as "Low", at S422, but changes the contamination level to "Middle" only when the received amount of light at the light receiver 312, 412, 512 is lower than the lower bound C of the light amount range corresponding to the contamination level "Low", S423. Additionally, this result is notified to the user through the contamination checker 700. When the contamination level is determined, the operation of S500 is performed to determine whether or not to replace the filter 200.

Figure 14:
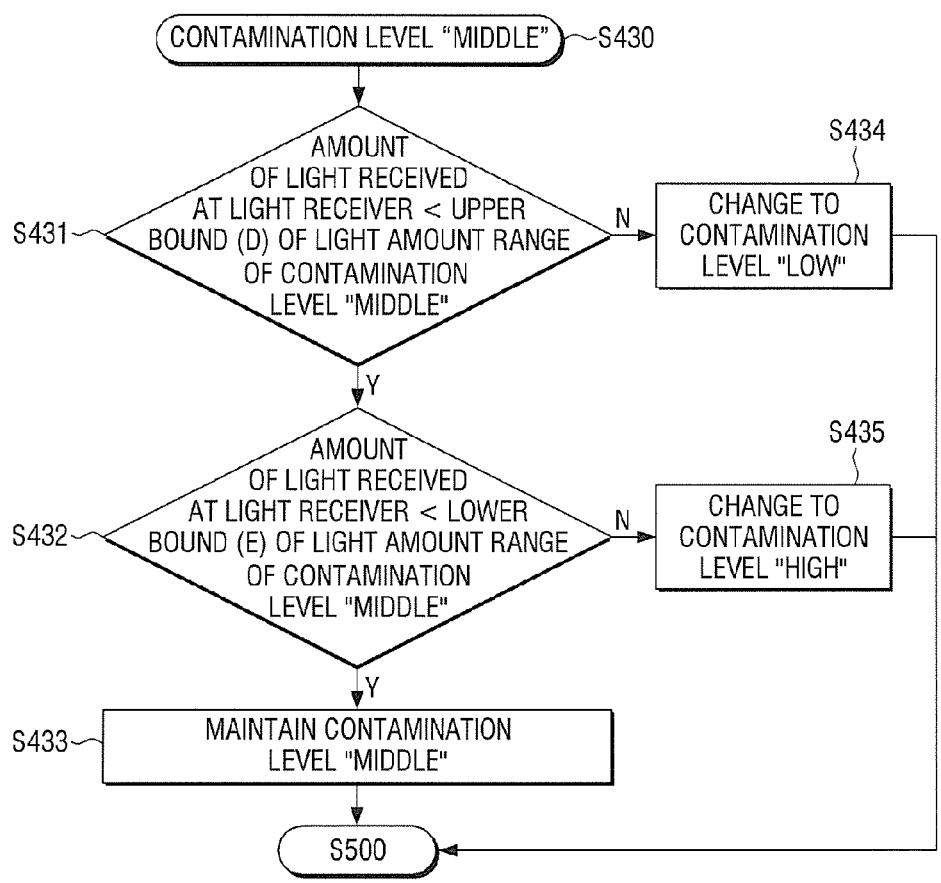

Further, referring to FIGS. 12 and 14, when the contamination level is determined by the controller 600 to be "Middle" based on the use time of the filter 200 and the received amount of light at the light receiver 312, 412, 512, at S430, the controller 600 compares the received amount of light at the light receiver 312, 412, 512 with the upper bound D of the amount of the light corresponding to the light amount range of the contamination level "Middle", at S431. When the received amount of light at the light receiver 312, 412, 512 is higher than the upper bound D of the amount of the light corresponding to the light amount range of the contamination level "Middle", the contamination level is changed to "Low", at S434, and additionally, this result is notified to the user through the contamination checker 700. However, when the received amount of light at the light receiver 312, 412, 512 is lower than the upper bound D of the amount of the light corresponding to the light amount range of the contamination level "Middle", an operation is performed to compare with the lower bound E of the amount of the light corresponding to the light amount range of the contamination level "Middle", at S432.

Next, the contamination level is maintained to be "Middle", when the received amount of light at the light receiver 312, 412, 512 is higher than the lower bound E of the amount of the light corresponding to the light amount range of the contamination level "Middle", at S433, but the contamination level is changed to "High" when the received amount of light at the light receiver 312, 412, 512 is lower than the lower bound E of the amount of the light corresponding to the light amount range of the contamination level "Middle", at S435. Additionally, this result is notified to the user through the contamination checker 700. When the contamination level is determined, the operation of S500 is performed to determine whether or not to replace the filter 200.

Figure 15:
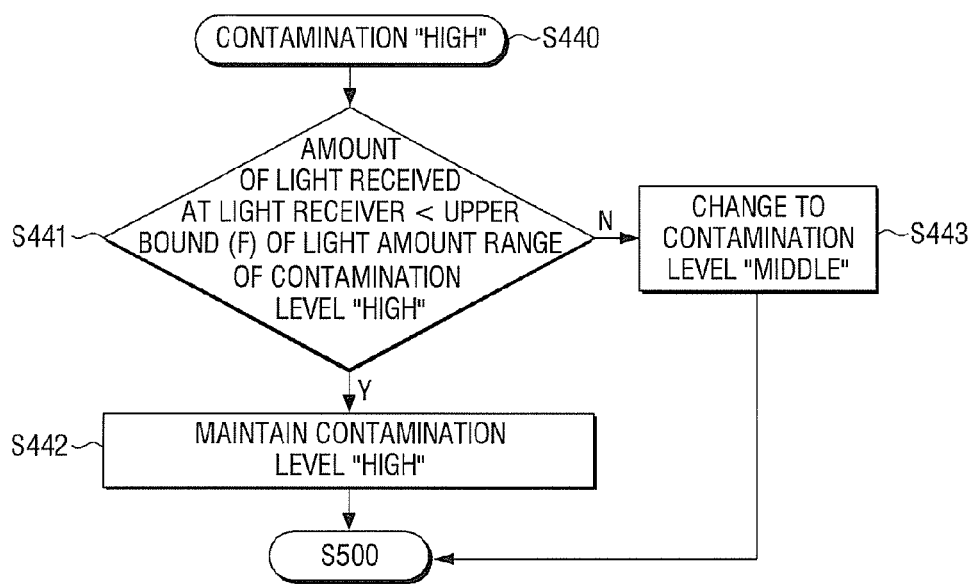
Figure 16:
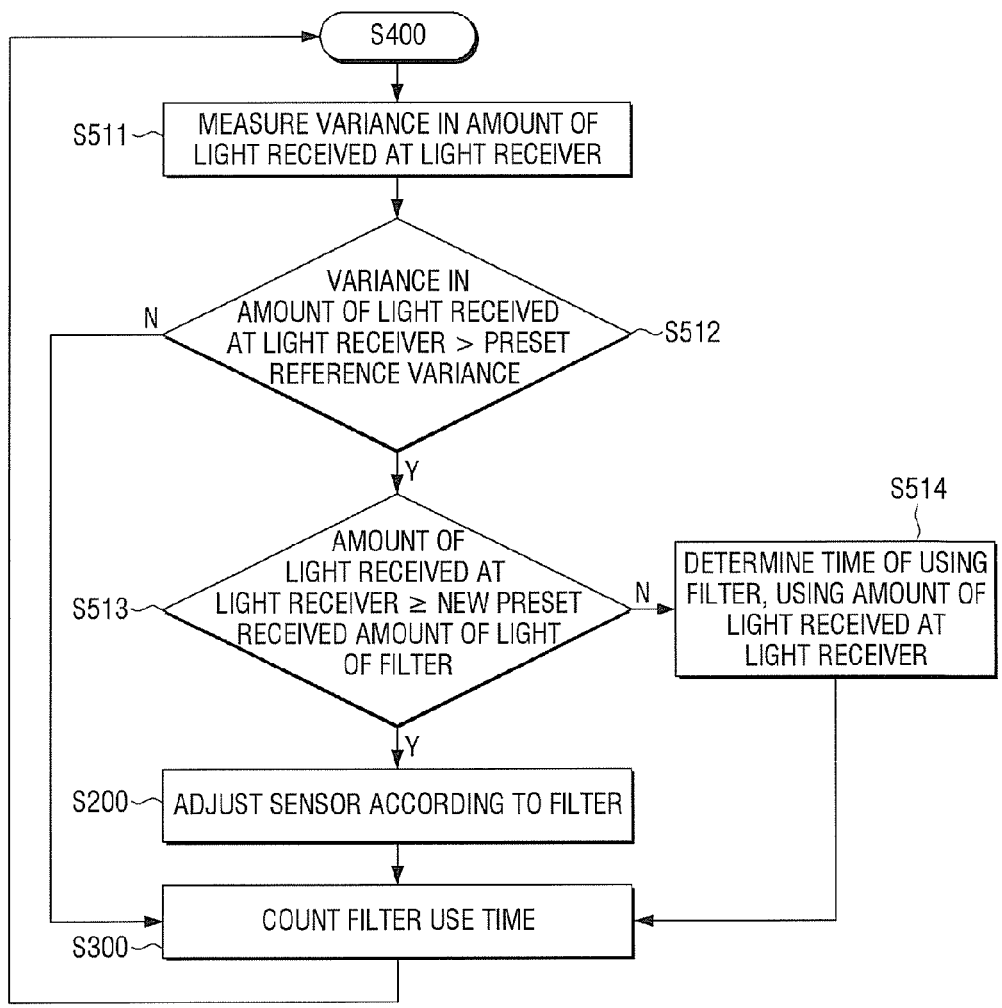

Further, referring to FIGS. 12 and 15, when the contamination level is determined by the controller 600 to be "High" based on the use time of the filter 200 and the received amount of light at the light receiver 312, 412, 512, at S440, the controller 600 compares the received amount of light at the light receiver 312, 412, 512 with the upper bound F of the amount of the light corresponding to the light amount range of the contamination level "High", at S441. When the received amount of light at the light receiver 312, 412, 512 is higher than the upper bound F of the amount of the light corresponding to the light amount range of the contamination level "High", the contamination level is changed to "Middle", at S443, or the contamination level is maintained to be "Middle" when the received amount of light at the light receiver 312, 412, 512 is lower than the upper bound F of the amount of the light corresponding to the light amount range of the contamination level "High", at S442. Additionally, this result is notified to the user through the contamination checker 700. When the contamination level is determined, the operation of S500 is performed to determine whether or not to replace the filter 200.

Accordingly, the operation of S500 is performed to determine whether or not to replace the filter 200. Specifically, referring to FIG. 16, the light receiver 312, 412, 512 repeats the process of converting the information of the received amount of light at the light receiver 312, 412, 512 into an electrical signal and delivering the result to the controller 600, and upon receiving the information of the amount of light from the light receiver 312, 412, 512, the controller 600 stores the information, while concurrently measuring variance in the received amount of light at the light receiver 312, 412, 512 based on a difference in the delivered amount of light, at S511.

Next, the controller compares the variance in the received amount of light at the light receiver 312, 412, 512 with a preset reference variance, at S512. The "preset reference variance" as used herein generally refers to an amount of variation occurring in the received amount of light at the light receiver 312, 412, 512 due to progressive contamination of the filter 200 during the course of use of the filter 200. Specifically, when the contaminated filter 200 is replaced with a new one 200, the received amount of light at the light receiver 312, 412, 512 will experience abrupt change from very little amount to high amount, and this is taken into consideration when determining whether or not to replace the filter 200. When the variance of the received amount of light at the light receiver 312, 412, 512 is lower than the preset reference variance, it is determined that the filter 200 is to be kept in use without replacement, and the operation moves on to the operation of S300 of counting use time of the filter 200.

On the contrary, when the variance of the received amount of light at the light receiver 312, 412, 512 is higher than the preset reference variance, it is determined that the filter 200 has been replaced, in which case an operation of S513 is performed to compare the received amount of light at the light receiver 312, 412, 512 with a preset, received amount of light of the new filter 200. The "preset, received amount of light of new filter" as used herein refers to an amount of light received at the light receiver 312, 412, 512 after the light emitted from the light emitter 311, 411, 511 is passed through the uncontaminated, new filter 200 and then received at the light receiver 312, 412, 512, and it is higher than the amount of light which is either reflected from or passed through the contaminated filter 200.

When the received amount of light at the light receiver 312, 412, 512 is equal to or higher than the preset, received amount of light of the new filter 200, it is determined that the new filter 200 has been mounted, and the operation of S200 is performed to adjust the contamination sensor 300 according to the filter 200. On the contrary, when the received amount of light at the light receiver 312, 412, 512 is lower than the preset, received amount of light of the new filter 200, it is determined that the filter 200 is the used one which has been in use for a predetermined time period, and at operation S514 the use time of the filter 200 is estimated using the received amount of light at the light receiver 312, 412, 512. After that, the operation of S300 is performed to count the use time of the filter 200 by reflecting the estimated time.

As described herein, since the contamination sensor 300, 400, 500 is integrally formed in a manner such that the light emitter 311, 411, 511 and the light receiver 312, 412, 512 are at a near distance, the light receiver 312, 412, 512 receiving the light emitted from the light emitter 311, 411, 511 has relatively good sensitivity, according to which the contamination level of the filter 200 is measured with further enhanced accuracy.

Moreover, since the contamination level is measured by considering both the use time of the filter 200 and the received amount of light at the light receiver 312, 412, 512, more accurate contamination level is measured. Further, user convenience is also provided, since the additional information such as whether or not the contamination sensor is re-adjusted, the filter needs replacement, or the filter is mounted properly, is automatically determined and notified to the user.

Although the present disclosure has been described with an exemplary embodiment, various changes and modifications is suggested to one skilled in the art. It is intended that the present disclosure encompass such changes and modifications as fall within the scope of the appended claims.

What is claimed is:

1. An air purifier, comprising:
   a main body including an inlet configured to receive air and a discharger configured to discharge the air;
   a filter disposed within the main body and configured to purify contaminants from the air; and
   a contamination sensor disposed adjacent to the filter, wherein the contamination sensor integrally comprises a light emitter configured to emit a light toward the filter and a light receiver configured to receive the light emitted from the light emitter;
   a controller configured to receive a received amount of light at the light receiver and determine a contamination level as a function of a use time of the filter and the amount of light received at the light receiver; and
   a contamination checker connected to the controller to allow a user to check the contamination level.

2. The air purifier of claim 1, wherein the light emitted from the light emitter is reflected against or passed through the filter and then received at the light receiver.

3. The air purifier of claim 1, wherein the light emitter is disposed so as to emit the light to a first surface of the filter where the contaminants are purified from the air received through the inlet, or to a second surface opposite from the first surface.

4. The air purifier of claim 3, wherein the light receiver is disposed so as to face the first surface or the second surface of the filter.

5. The air purifier of claim 3, wherein the light receiver is disposed so as to face the first surface or the second surface of the filter which is the same surface that the light emitter faces.

6. The air purifier of claim 5, wherein the light emitter and the light receiver are disposed parallel to each other, or at a predetermined angle in a direction where the light emitter and the light receiver face each other.

7. The air purifier of claim 1, wherein the light emitter and the light receiver are disposed so as to face each other, so that the light emitted from the light emitter is passed through the filter and received at the light receiver.

8. The air purifier of claim 1, wherein the contamination sensor comprises a plurality of contamination sensors.

9. The air purifier of claim 1, wherein the contamination sensor is attached to or inserted into the main body.

10. A method implemented using an air purifier, the method comprising:
    mounting a filter to the air purifier;
    adjusting a light emitter and a light receiver of a contamination sensor according to the filter;
    counting a use time of the filter; and
    measuring a contamination level of the filter, wherein measuring the contamination level of the filter comprises dividing the contamination level of the filter into at least two or more stages as a function of the use time of the filter and an amount of light received at the light receiver.

11. The method of claim 10, wherein measuring the contamination level of the filter comprises:
    measuring, at a first contamination stage, the contamination level of the filter as a function of the use time of the filter; and
    measuring, at a second contamination stage, the contamination level of the filter as a function of the received amount of light at the light receiver.

12. The method of claim 11, wherein the first and second contamination stages are changed only when the received amount of light at the light receiver is higher or lower than a boundary amount of light of each contamination stage by a predetermined amount of light.

13. The method of claim 10, wherein measuring the contamination level comprises measuring the contamination level of the filter periodically according to a preset time cycle.

14. The method of claim 10, further comprising after the contamination level is measured, determining whether or not the filter has been replaced by measuring a variance of the received amount of light at the light receiver, wherein counting use time of the filter is performed when the filter has not been replaced or the contamination sensor is re-set when the filter has been replaced.

15. The method of claim 14, wherein determining further comprises determining whether the filter is a new filter or a used one which has been in use for a predetermined time period based on the received amount of light at the light receiver, wherein, when the replaced filter is the new filter, the sensor is adjusted, or when the replaced filter is the used filter which has been in use for the predetermined time period, determining the time of using the replaced filter by using the received amount of light at the light receiver, reflecting a result, and counting the use time of the filter are performed.

16. The method of claim 14, repeating between the step of counting the use time of the filter and the filter replacement determining for a preset time period.

17. The method of claim 10, wherein adjusting the sensor comprises:
    increasing a duty of the light emitter when the received amount of light at the light receiver is lower than a minimum amount of light; and
    decreasing the duty of the light emitter when the received amount of light at the light receiver is higher than a minimum amount of light.

18. The method of claim 10, between the filter mounting and the adjusting the sensor, further comprises filter checking based on the received amount of light at the light receiver whether or not the filter is mounted or whether or not the filter is mounted with a packaging material removed.

19. The method of claim 18, wherein checking the filter comprises determining that the filter is not yet mounted and notifying a result to a user when the received amount of light at the light receiver is lower than a preset amount of light.

* * * * *